(12) United States Patent
Ueda

(10) Patent No.: US 6,486,931 B1
(45) Date of Patent: Nov. 26, 2002

(54) LCD OPTICAL GUIDE PLATE WITH A ROUGHENED BACK SURFACE HAVING PROJECTIONS THAT SUPPORT A REFLECTING SHEET

(75) Inventor: Shoichi Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 129 days.

(21) Appl. No.: 09/592,914

(22) Filed: Jun. 13, 2000

(30) Foreign Application Priority Data

Jun. 14, 1999 (JP) .......................................... 11-166633

(51) Int. Cl.$^7$ ............................................. G02F 1/1335
(52) U.S. Cl. ................................ 349/65; 349/64; 362/31
(58) Field of Search .............................. 349/61, 62, 64, 349/65, 67; 362/31, 561, 330, 339

(56) References Cited

U.S. PATENT DOCUMENTS

| | | | |
|---|---|---|---|
| 5,584,556 A | * 12/1996 | Yokoyama et al. | 362/31 |
| 5,703,667 A | 12/1997 | Ochiai | |
| 5,961,198 A | * 10/1999 | Hira et al. | 362/31 |
| 6,154,262 A | * 11/2000 | Ogura | 349/61 |
| 6,211,929 B1 | * 4/2001 | Hiraishi et al. | 349/65 |
| 6,259,854 B1 | * 7/2001 | Shinji et al. | 385/146 |
| 6,280,043 B1 | * 8/2001 | Ohkawa | 362/31 |
| 6,359,668 B1 | * 3/2002 | Iijima et al. | 349/61 |

FOREIGN PATENT DOCUMENTS

| | | |
|---|---|---|
| JP | 2-176629 | 7/1990 |
| JP | 3-264982 A | 11/1991 |
| JP | 5-224019 A | 9/1993 |
| JP | 6-167617 A | 6/1994 |
| JP | 6-347788 A | 12/1994 |
| JP | 7-94008 | 4/1995 |
| JP | 8-31217 A | 2/1996 |
| JP | 9-325218 | 12/1997 |
| JP | 10-208529 A | 8/1998 |
| JP | 11-52139 A | 2/1999 |

* cited by examiner

Primary Examiner—Toan Ton
Assistant Examiner—Andrew Schechter
(74) Attorney, Agent, or Firm—Foley & Lardner

(57) ABSTRACT

An optical guide plate serves as a surface illuminant in a liquid crystal display, and includes a transparent optical guide body shaped in a trapezoidal prism, a line light source radiating light toward the bottom surface serving as an incident surface and a reflecting sheet opposed to a granulated diffusion surface extending between the incident surface and a top surface and opposed to a light output surface, wherein micro projections are formed on the granulated diffusion surface so as to form an air layer between the granulated diffusion surface and the reflection sheet without any direct contact between the granulated diffusion surface and the reflection sheet, thereby permitting the incident light to be propagated through the air layer.

22 Claims, 5 Drawing Sheets

LCD OPTICAL GUIDE PLATE WITH A ROUGHENED BACK SURFACE HAVING PROJECTIONS THAT SUPPORT A REFLECTING SHEET

FIELD OF THE INVENTION

This invention relates to a liquid crystal display and, more particularly, to a liquid crystal display equipped with an optical guide plate and a process for fabrication thereof.

DESCRIPTION OF THE RELATED ART

An optical guide plate is incorporated in a liquid crystal display together with a light source such as a lighting equipment or a back light. The light source radiates light, and the optical guide plate directs the light toward an array of pixels. The optical guide plate makes the light source serve as a surface illuminant.

A typical example of the optical guide plate has a diffusing surface, a light output surface and an incident surface. The diffusing surface is opposed to the light output surface, and the incident surface extends between the diffusing surface and the light output surface. The light source is attached to the incident surface, and the light is incident on the incident surface. Most of the light repeats the reflection at the boundary between the optical guide plate and the air due to the difference of optical density therebetween, and proceeds in the optical guide plate. While the light is proceeding, the light is irregularly reflected on an irregular reflecting means. When a light component is incident on the irregular reflecting means at the incident angle equal to or less than the critical angle, the light component is output from the light output surface. The irregular reflecting means is implemented by a white printed layer of diffusing material such as white ink. Otherwise, the diffusing surface is granulated or roughened so as to make it granulated.

User requests the manufacturer to make the surface illuminant thin. The granulated surface is suitable for the user's request. An example of the prior art optical guide plate with the granulated surface is disclosed in Japanese Patent Publication of Unexamined Application (laid-open) No. 2-176629.

FIG. 1 illustrates the prior art optical guide plate disclosed in the Japanese Patent Publication of Unexamined Application. The prior art optical guide plate comprises an optical guide body, a line light source 3, a curved mirror 4 and a reflecting sheet 5. The optical guide body 1 has a diffusing surface 2a, a light output surface 2b and a side surface therebetween. The diffusing surface 2a is inclined with respect to the light output surface 2b, and the distance therebetween is decreased from the side surface toward the other side surface. The side surface serves as an incident surface, and the line light source 3 is opposed to the side surface. The curved mirror 5 is attached to the optical guide body 1 so as to encapsulate the line light source 3 inside the space defined by the curved mirror and the side surface. The diffusing surface 2a is granulated, and the reflecting sheet 5 is attached to the granulated diffusion surface 2a. The air is confined between the granulated diffusion surface 2a and the reflecting sheet 5.

When the line light source 3 is energized, the line light source 3 radiates light, and the light is incident onto the side surface. The incident light proceeds in the prior art optical guide plate. The light radiated from the optical guide body 1 toward the reflecting sheet 5, and is reflected thereon. The light is partially reflected on the diffusion surface 2a. Thus, the light repeats the reflection and refraction at the boundary between the air and the optical guide body 1, and proceeds toward the side surface opposite to the incident surface. The light is partially reflected on the diffusing surface 2a, and is radiated from the light output surface 2b.

A problem is encountered in the prior art optical guide plate in that the luminance on the light output surface 2b is gradually reduced toward the side surface opposite to the incident surface. Another problem is that the light output surface 2b is not uniform in brightness.

SUMMARY OF THE INVENTION

It is therefore an important object of the present invention to provide an optical guide plate, which has a light output surface constant in the luminance over the distance between an incident surface and the opposite surface and, accordingly, uniform in the brightness thereover.

It is also an important object of the present invention to provide a process for fabricating the optical guide plate.

The present inventor contemplated the problem inherent in the prior art optical guide plate, and found that the air was locally evacuated from between the optical guide body 1 and the reflecting sheet 5. The non-uniform brightness and the reduction of luminance were derived from the local evacuation of the air as follows. The surface roughness of the diffusion surface 2a was 1 to 5 microns, and the optical guide body 1 tended to locally hold the reflecting sheet 5 in contact with the diffusion surface 2a. The air was evacuated from between the part of the diffusion surface 2a and the reflecting sheet 5. The total reflection took place on the part of the diffusion surface 2a, and the part of the diffusion surface interrupted the optical propagation through the air. If there was the air constant over the boundary between the diffusion surface 2a and the reflecting sheet 5, all the light was not taken into the optical guide body 1, again, due to the difference in density between the optical guide body 1 and the air. Thus, the amount of light was reduced in the direction leaving the incident surface, and the luminance was reduced due to the shortage of the light. On the other hand, the total reflection locally increased the amount of output light, and made the brightness on the light output surface 2b non-uniform.

To accomplish the object, the present invention proposes to form micro-projections large enough to space the reflecting sheet from the diffusion surface.

In accordance with one aspect of the present invention, there is provided an optical guide plate used in a liquid crystal display comprising an optical guide body formed of a transparent material, and including an incident surface, a granulated diffusion surface for scattering light components, a light output surface for radiating the light components therefrom and micro-projections formed on the granulated diffusion surface and having peaks spaced from the granulated diffusion surface wider than the granulation, a reflecting sheet supported by the peaks of the micro-projections so as to form an air layer therebetween, and a light source opposed to the incident surface for supplying the light components to the optical guide body.

In accordance with another aspect of the present invention, there is provided a process for fabricating an optical guide plate, comprising the steps of forming a transparent optical guide body having an incident surface, a granulated diffusion surface, a light output surface and micro-projections formed on the granulated diffusion surface and having peaks spaced from the granulated diffusion surface wider than the granulation, and assembling a reflecting sheet and a light source with the transparent optical guide in such a manner that the reflecting sheet is supported by the peaks and that the light source is opposed to the incident surface.

BRIEF DESCRIPTION OF THE DRAWINGS

The features and advantages of the optical guide plate and the process of fabrication will be more clearly understood from the following description taken in conjunction with the accompanying drawings in which.

DESCRIPTION OF THE PREFERRED EMBODIMENTS

First Embodiment

Figure 1:
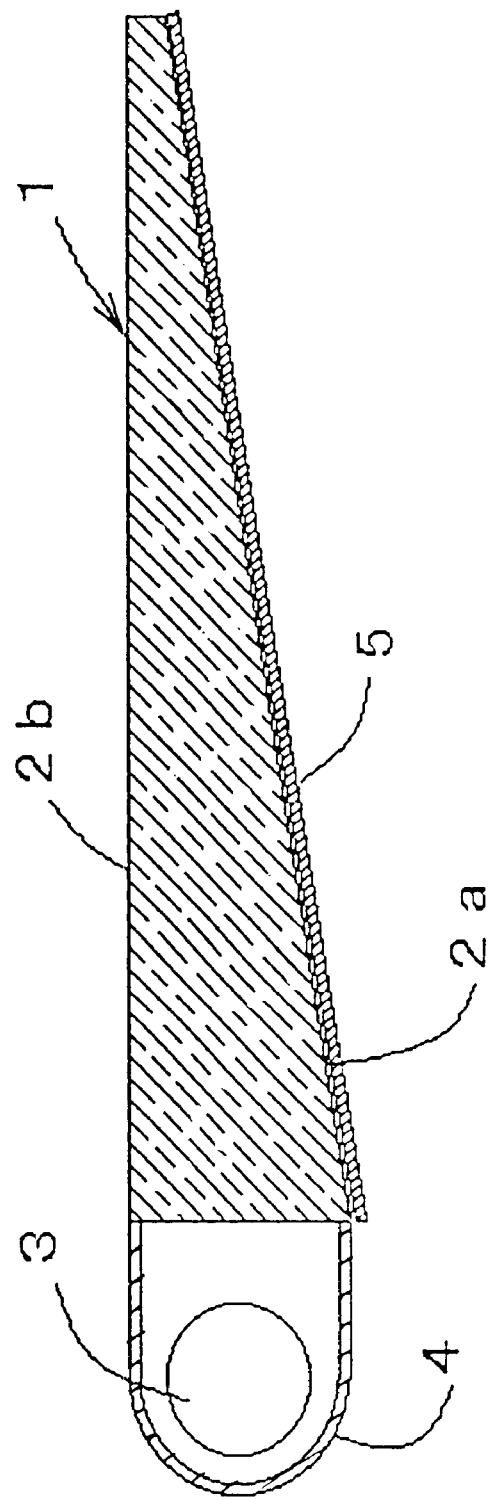
FIG. 1 is a cross sectional view showing the structure of the prior art optical guide plate disclosed in Japanese Patent Publication of Unexamined Application No. 2-176629.
Figure 2:
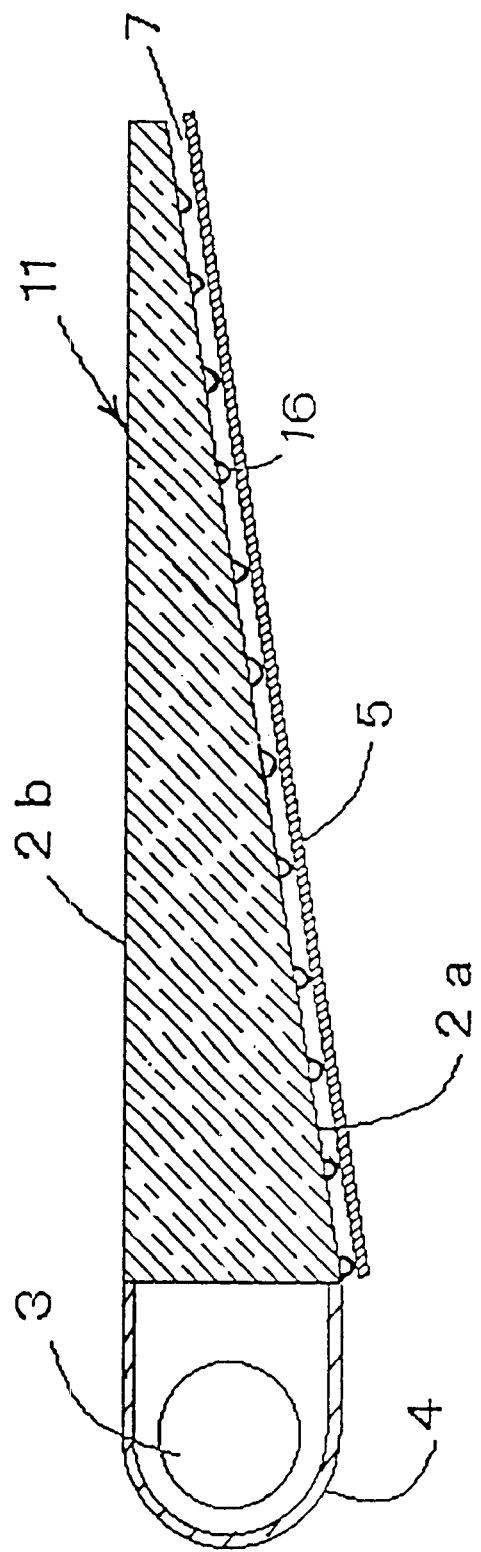
FIG. 2 is a cross sectional view showing the structure of an optical guide plate according to the present invention.

Referring to FIG. 2 of the drawings, an optical guide plate embodying the present invention largely comprises an optical guide body 11, a line light source 3, a concave mirror 4 and a reflecting sheet 5. The optical guide body 11 is formed of acrylic resin, which is transparent and, accordingly, high in optical transmittance. The optical guide body 11 has two major surfaces 2a/2b and two side surfaces extending between the two major surfaces. The major surface 2a is inclined with respect to the other major surface 2b, and the major surfaces 2a/2b and the side surfaces define a trapezoidal cross section. The thickness or the distance between the major surfaces 2a/2b is rightward decreased from 3 millimeters to 1 millimeter.

The major surface 2a is made granulated, and serves as a diffusing surface. The surface roughness of the major surface 2a or the depth from the master flat plane to the deepest valley ranges from 1 micron to 5 microns. The granulation is at low dense on the left side close to the line light source 3, and gets higher in the direction leaving the line light source 3. In other words, the granulation is increased from the incident surface toward the other side surface.

A plenty of micro semi-spherical projections 16 are formed on the major surface 2a, and are fifty to a hundred per square centimeter. The micro semi-spherical projections 16 are 10 to 20 microns in height. The other major surface 2b serves as a light output surface, and the wide side surface serves as an incident surface.

The other major surface 2b serves as a light output surface, and is over-lapped with a glass substrate (not shown), which confines liquid crystal together with another glass substrate.

The line light source 3 extends along the wide side surface, and is spaced therefrom. A small-sized fluorescent lamp or a filament lamp is available for the optical guide plate. The concave mirror 4 is attached to the optical guide plate 1, and an inner space is defined between the incident surface and the concave mirror 4. The line light source 3 radiates light, and the light is confined in the space. The concave mirror 4 directs the light toward the incident surface, and all the light is incident on the incident surface.

The reflection sheet 5 is supported by the plenty of micro semi-spherical projections 16, and is certainly spaced from the granulated surface 2a without any direct contact with the granulated surface 2a by virtue of the micro semi-spherical projections 16. Thus, the air layer 7 intervenes between the entire granulated surface 2a and the reflection sheet 5. Light is reflected on the reflection sheet 5, and is partially taken into the optical guide body 1, again.

Figure 3:
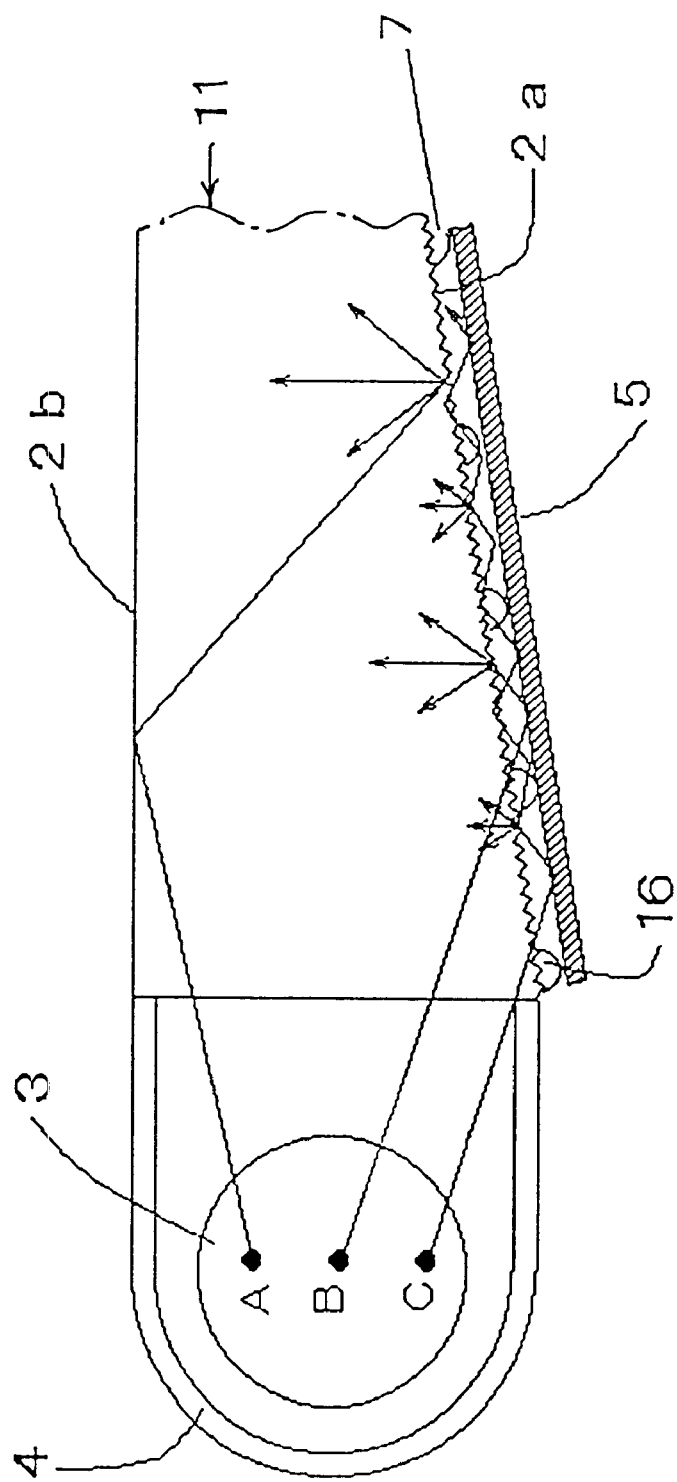
FIG. 3 is a schematic view showing reflection in the optical guide plate.

The optical guide plate guides light toward the light output surface 2b. FIG. 3 illustrates light components A, B, and C propagated from the line light source 3 through typical optical paths. The light components A, B and C behave as follows.

The light component A directly proceeds to the light output surface 2b. Only a small amount of light component A is radiated from the light output surface 2b, and most of the light component A is inwardly reflected on the light output surface 2b, and is directed toward the diffusion surface 2a. The light component A is scattered through the irregular reflection on the granulation of the diffusion surface 2a, and light sub-components proceed toward the light output surface 2b. However, part of the light component A may pass the diffusion surface 2a. The part of the light component A proceeds to the reflection sheet 5, and is reflected thereon. The behavior of the reflected light will be hereinlater described in detail.

The light components B and C proceed toward the diffusion surface 2a, and pass the diffusion surface 2a. The light components B/C may be partially scattered on the diffusion surface 2a. The light components B and C proceed to the reflection sheet 5, and is reflected on the reflection sheet 5.

The reflected light components A/B/C repeat the reflection and the refraction so as to proceed through the air layer 7 in the direction leaving the incident surface. When the light component A/B/C is reflected on the diffusion surface 2a, part of the light component A/B/C passes through the diffusion surface 2a, and proceeds toward the light output surface 2b. If the part of the light component A/B/C is incident on the light output surface 2b at an incident angle less than the critical angle, the part of the light component A/B/C is radiated from the light output surface 2b. All the reflected light components A/B/C are propagated through the air layer 7 without any intervention of direct contact between the reflecting sheet 5 and the diffusion surface 2a. As a result, the luminance is uniform over the light output surface 2b, and the light output surface 2b achieves uniform brightness. Any reduction of luminance and any locally high brightness do not take place.

The optical guide plate is fabricated as follows. First, an injection molding die unit is prepared. A space is defined in the injection molding die unit, and is identical in configuration with the optical guide body 11. The injection molding die unit has an inner granulated surface formed with micro semi-spherical recesses. The inner surface is corresponding to the major surface 2a of the optical guide body 11.

The inner granulated surface with the micro semi-spherical recesses is formed as follows. The inner surface is granulated by using a standard technique. A honing machine (not shown) is opposed to the inner granulated surface of the molding die unit, and 60-mesh glass beads are impinged to the inner surface. The 60-mesh glass beads forms the micro semi-spherical recesses in the inner granulated surface.

Subsequently, the melted acrylic resin is injected into the injection molding die unit, and is spread in the space. The melted acrylic resin is solidified so as to form the optical guide body 11. The granulation is transferred from the inner granulated surface of the injection molding die unit to the major surface 2a of the optical guide body 11, and the micro semi-spherical recesses permit the major surface 2a to conformably project so as to form the micro semi-spherical projections 16.

Finally, the reflection sheet S is attached to the optical guide body 1 in such a manner as to form the air layer 7. Namely, the micro semi-spherical projections 16 support the reflection sheet 5 without any direct contact between the reflection sheet 5 and the granulated diffusion surface 2a. The line light source 3 and the concave mirror 4 are assembled with the optical guide body 11. The assembling work between the line light source /concave mirror 3/4 and the optical guide body 11 may be carried out prior to the assembling work between the reflection sheet 5 and the optical guide body 11.

As will be understood from the foregoing description, the micro semi-spherical projections project from the granulated diffusion surface 2a, and prohibits the reflection sheet 5 from any direct contact with the granulated diffusion surface 2a. The air layer 7 is surely formed between the granulated diffusion surface 2a and the reflection sheet 5, and the air layer 7 extends under the entire light output surface 2b. The incident light is uniformly diffused over the optical guide body 11, and the luminance and the brightnes's become uniform.

Second Embodiment

Figure 4:
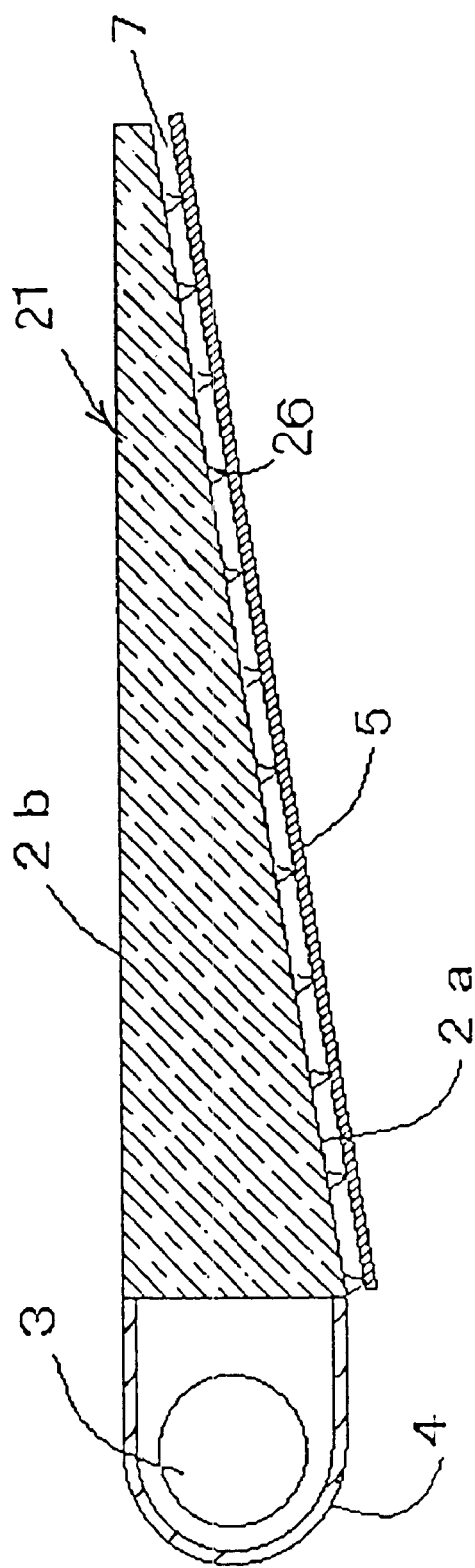
FIG. 4 is a cross sectional view showing the structure of another optical guide plate according to the present invention.

Turning to FIG. 4 of the drawing, another optical guide plate embodying the present invention comprises an optical guide body 21. Other parts of the optical guide plate implementing the second embodiment are similar to those of the first embodiment, and are labeled with the references designating corresponding parts of the first embodiment without detailed- description.

The optical guide body 21 is formed of transparent material such as, for example, acrylic resin, and micro-projections 26 are formed on the granulated diffusion surface 2a. The micro-projections 26 are shaped in a circular cone. The micro-projections 26 may be as high as the micro semi-spherical projections 16, and are fallen within the same density range. The optical guide plate achieves all the advantages of the first embodiment.

Third Embodiment

Figure 5:
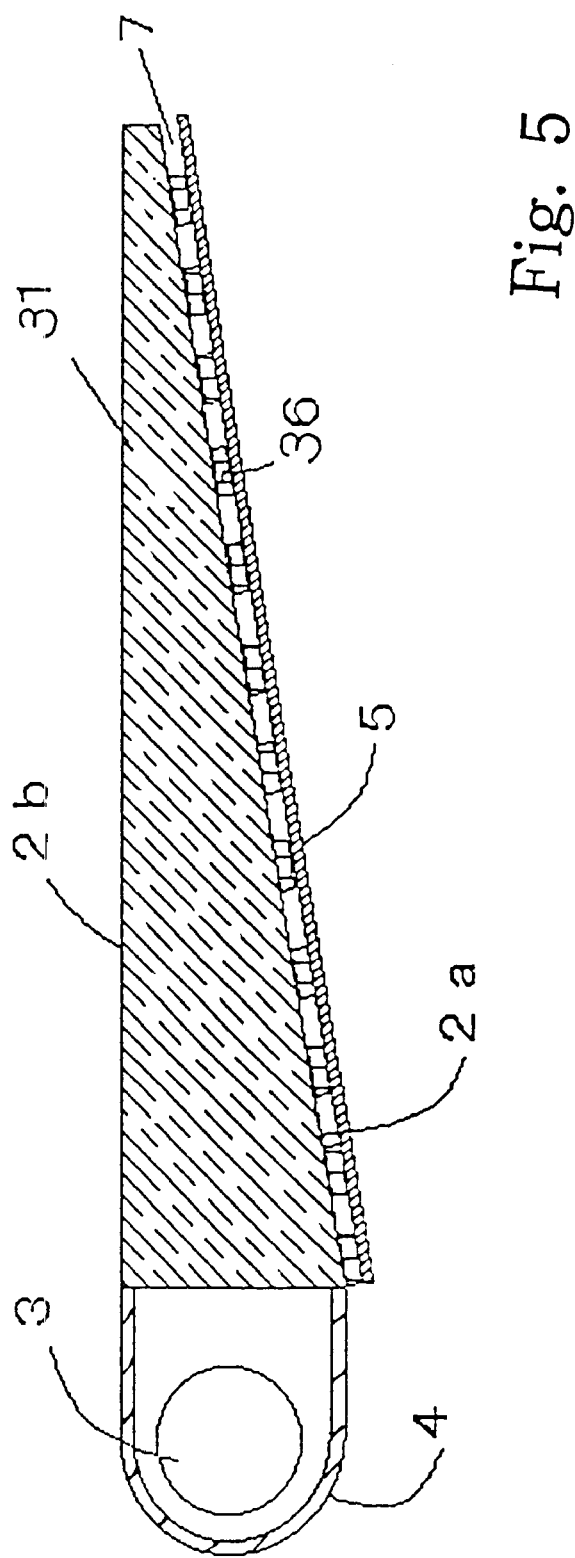
FIG. 5 is a cross sectional view showing the structure of yet another optical guide plate according to the present invention.

FIG. 5 shows yet another optical guide plate embodying the present invention. The optical guide plate implementing the third embodiment comprises an optical guide body 31. Other parts of the optical guide plate implementing the third embodiment are similar to those of the first embodiment, and are labeled with the references designating corresponding parts of the first embodiment without detailed description. The optical guide plate achieves all the advantages of the first embodiment.

The optical guide body 31 is formed of transparent material such as, for example, acrylic resin, and micro-projections 36 are formed on the granulated diffusion surface 2a. The micro-projections 36 are shaped in a triangular prism. In this instance, the micro-projections 36 are 10 microns in height, 30 microns in width and 200 microns in length, and are arranged at pitches of 200 microns.

As will be appreciated from the foregoing description, the micro projections surely form the air layer 7 between the diffusion surface 2a and the reflection sheet 5, and the air layer 7 permits the light to proceed toward the side surface opposite to the incident surface. This results in the uniform luminance and brightness.

Although particular embodiments of the present invention have been shown and described, it will be apparent to those skilled in the art that various changes and modifications may be made without departing from the spirit and scope of the present invention. For example, the micro-projections may have an appropriate configuration different from the semi-spherical configuration, the circular cone and the triangular prism. The optical guide body may be formed of another kind of transparent material.

What is claimed is:

1. An optical guide plate used in a liquid crystal display, comprising:

an optical guide body formed of a transparent material, and including an incident surface, a granulated diffusion surface for scattering light components, a light output surface for radiating said light components therefrom and projections formed on said granulated diffusion surface, said projections having peaks with a height dimension of approximately 10 microns to 20 microns, which height dimension is greater than the dimensions of a granulation of the granulated diffusion surface;

a reflecting sheet supported by said peaks of said projections so as to form an air layer between the reflecting sheet and the granulated diffusion surface; and a light source opposed to said incident surface for supplying said light components to said optical guide body.

2. The optical guide plate as set forth in claim 1, in which a density of said projections is within the range of 50 to 100 per square centimeter.

3. The optical guide plate as set forth in claim 2, in which said projections are shaped into semi-spherical configurations.

4. The optical guide plate as set forth in claim 2, in which said projections are shaped into circular cones.

5. The optical guide plate as set forth in claim 1, in which said projections are shaped into triangular prisms.

6. The optical guide plate as set forth in claim 5, in which said projections are approximately 10 microns in height, 30 microns in width and 200 microns in length, and are arranged at pitches of approximately 200 microns.

7. The optical guide plate as set forth in claim 1, in which said optical guide plate further has a side surface opposed to said incident surface, wherein said granulated diffusion surface and said light output surface extend between one edge line of said incident surface and one edge line of said side surface and between the other edge line of said incident surface and the other edge line of said side surface, respectively, so that said reflection sheet forms said air layer between said incident surface and said side surface.

8. The optical guide as set forth in claim 7, in which said light source is implemented by a line light source opposed to said incident surface.

9. The optical guide plate as set forth in claim 7, in which the granulation of said granulated diffusion surface is increased in density from said incident surface toward said side surface.

10. The optical guide plate as set forth in claim 7, in which said incident surface is wider than said side surface so that a distance between said light output surface and said granulated diffusion surface is greater where the light output surface and the granulated diffusion surface meet the incident surface than where they meet the side surface.

11. The optical guide plate as set forth in claim 10, in which the granulation of said granulated diffusion surface is increased in density from said incident surface toward said side surface.

12. The optical guide plate as set forth in claim 1, further comprising a curved mirror attached to said optical guide body in such a manner as to surround round said light source for reflecting the light components toward said incident surface.

13. A process for fabricating an optical guide plate, comprising the steps of:
   a) forming a transparent optical guide body having an incident surface, a granulated diffusion surface, a light output surface, and projections formed on said granulated diffusion surface, said projections having peaks with a height dimension of approximately 10 microns to 20 microns, which height dimension is greater than the dimensions of a granulation of the granulated diffusion surface; and
   b) assembling a reflecting sheet and a light source with said transparent optical guide body in such a manner that said reflecting sheet is supported by said peaks and that said light source is adjacent to said incident surface.

14. The process as set forth in claim 13, in which said step a) includes the sub-steps of
   a-1) preparing an intermediate product of a molding die unit formed with a space corresponding to a configuration of said transparent optical guide body and having a granulated surface partially defining said space,
   a-2) impinging micro glass beads against said granulated surface so as to form micro recesses corresponding to said projections,
   a-3) introducing melted material into said space so as to fill said space therewith, and
   a-4) solidifying said melted material for forming said transparent optical guide body.

15. The process as set forth in claim 14, in which said melted material is acrylic resin.

16. The process as set forth in claim 14, in which said micro glass beads are corresponding to 60 meshes.

17. The process as set forth in claim 14, in which said projections range from approximately 10 microns to 20 microns in height, and the density of said projections is within the range of approximately 50 to 100 per square centimeter.

18. The process as set forth in claim 17, in which said micro recesses are shaped into semi-spherical configurations.

19. The process as set forth in claim 17, in which said micro recesses are shaped into circular cones.

20. The process as set forth in claim 14, in which said micro recesses are shaped into triangular prisms.

21. The process as set forth in claim 20, in which said projections are approximately 10 microns in height, 30 microns in width and 200 microns in length, and are arranged at pitches of approximately 200 microns.

22. The process as set forth in claim 14, in which the granulation on said granulated diffusion surface is increased in the direction away from said incident surface.

* * * * *